United States Patent
Mao et al.

(10) Patent No.: US 12,289,026 B2
(45) Date of Patent: Apr. 29, 2025

(54) VIBRATING MOTOR, ELECTRONIC DEVICE, AND CONTROL METHOD

(71) Applicant: AAC Microtech (Changzhou) Co., Ltd., Changzhou (CN)

(72) Inventors: Lubin Mao, Shenzhen (CN); Yun Tang, Shenzhen (CN); Jie Ma, Shenzhen (CN); Ziang Li, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 208 days.

(21) Appl. No.: 18/092,930

(22) Filed: Jan. 4, 2023

(65) Prior Publication Data
US 2024/0088768 A1    Mar. 14, 2024

Related U.S. Application Data
(63) Continuation of application No. PCT/CN2022/120233, filed on Sep. 21, 2022.

(30) Foreign Application Priority Data
Sep. 8, 2022    (CN) .......................... 202211096709.7

(51) Int. Cl.
  *H02K 33/02*    (2006.01)
  *H02K 1/34*    (2006.01)
  *H02K 5/22*    (2006.01)
(52) U.S. Cl.
  CPC ............... *H02K 33/02* (2013.01); *H02K 1/34* (2013.01); *H02K 5/22* (2013.01)
(58) Field of Classification Search
  CPC ............. H02K 33/02; H02K 1/34; H02K 5/22
  See application file for complete search history.

(56) References Cited

U.S. PATENT DOCUMENTS

| | | | | |
|---|---|---|---|---|
| 2009/0243404 | A1* | 10/2009 | Kim | H02K 33/16 310/25 |
| 2014/0265651 | A1* | 9/2014 | Kim | H02K 33/16 310/25 |

(Continued)

FOREIGN PATENT DOCUMENTS

| | | | | |
|---|---|---|---|---|
| CN | 111641312 A | * | 9/2020 | ............. H02K 33/02 |
| CN | 111641314 A | * | 9/2020 | ............. H02K 33/02 |
| KR | 102234342 B1 | * | 3/2021 | |

OTHER PUBLICATIONS

Kang (KR 102234342 B1) English Translation (Year: 2021).*
Gao (CN 111641312 A) English Translation (Year: 2020).*
Gao (CN 111641314 A) English Translation (Year: 2020).*

*Primary Examiner* — Tulsidas C Patel
*Assistant Examiner* — Robert E Mates
(74) *Attorney, Agent, or Firm* — Wiersch Law Group

(57) ABSTRACT

The present invention provides a vibrating motor, an electronic device, and a control method. The vibrating motor includes a housing, a vibrator assembly and a solenoid assembly. The vibrator assembly includes a mass block defining an accommodating cavity and magnets accommodated in accommodating cavity. The mass block are elastically connected to the housing. The magnets are magnetized for providing driving forces in a first direction and a second direction. The first direction is perpendicular to the second direction. The vibrator assembly vibrates along the first direction at a first vibration frequency. The vibrator assembly vibrates along the second direction at a second vibration frequency, or the solenoid assembly vibrates along the second direction at a third vibration frequency. The vibrating motor provide vibration senses in different directions and provide large vibration senses for different application scenarios, which is conducive to realization of multiple vibration feedback.

6 Claims, 11 Drawing Sheets

(56) References Cited

U.S. PATENT DOCUMENTS

| | | | |
|---|---|---|---|
| 2019/0260278 A1* | 8/2019 | Kim | H02K 33/18 |
| 2020/0044538 A1* | 2/2020 | Tang | H02K 33/18 |
| 2021/0405753 A1* | 12/2021 | Amin-Shahidi | G06F 3/016 |
| 2021/0408885 A1* | 12/2021 | Amin-Shahidi | H02K 33/18 |

* cited by examiner

VIBRATING MOTOR, ELECTRONIC DEVICE, AND CONTROL METHOD

TECHNICAL FIELD

The present invention relates to a technical field of motors, and in particular to a vibrating motor, an electronic device, and a control method.

BACKGROUND

Portable consumer electronic devices, such as cell phones, handheld gamepads, navigation devices, or handheld multimedia entertainment devices, etc., generally use linear motors to perform system feedback, e.g. an incoming call notification, vibration feedback of a gamepad, etc.

A linear motor in the prior art generally vibrates in a single X-direction or a single Z-direction, a vibration mode of which is single, so that a vibration sense provided by the linear motor for different application scenarios is small, and the linear motor only realizes a single vibration feedback.

Therefore, it is necessary to provide a new type of vibrating motor.

SUMMARY

Purposes of the present invention are to provide a vibrating motor, an electronic device, and a control method to at least solve defects in the prior art.

The present invention provides the vibrating motor. The vibrating motor comprises a housing defining an accommodating space, a vibrator assembly accommodated in the accommodating space, and a solenoid assembly accommodated in the accommodating space.

The vibrator assembly comprises a mass block and magnets. The mass block defines an accommodating cavity. Two ends of the mass block are elastically connected to the housing. The magnets are fixed to the mass block and are accommodated in the accommodating cavity.

The magnets are magnetized obliquely, and the magnets are for providing a first driving force in a first direction and a second driving force in a second direction. The first direction is perpendicular to the second direction. The vibrator assembly vibrates along the first direction at a first vibration frequency. The vibrator assembly vibrates along the second direction at a second vibration frequency, or the solenoid assembly vibrates along the second direction at a third vibration frequency. The first vibration frequency, the second vibration frequency, and the third vibration frequency are different.

Optionally, the housing comprises a base defining the accommodating space and a cover plate covered on the base. The solenoid assembly comprises iron cores fixedly connected to the cover plate and coils sleeved on an outer side of a respective iron core. The iron cores are accommodated in the accommodating cavity.

Optionally, the cover plate comprises a main body portion fixed to the base and a spring structure connected to the main body portion. The main body portion defines a mounting through hole. The spring structure is accommodated in the mounting through hole. The iron cores are connected to the spring structure. The iron cores vibrate along the second direction at the third vibration frequency.

Optionally, the spring structure comprises an elastic ring and a connecting portion arranged in the elastic ring. Two ends of the elastic ring are respectively connected to a side wall of the main body portion. Two ends of the connecting portion are respectively connected to the elastic ring. A connecting end of the connecting portion is adjacent to a connecting end of the elastic ring. The iron cores are connected to the connecting portion.

Optionally, the cover plate is a flat plate. The vibrator assembly vibrates along the second direction at the second vibration frequency.

Optionally, two magnets are provided and are arranged on two opposite sides of the mass block. The coils are arranged between the two magnets, and the vibrating motor further includes a pole core fixedly connected between the magnets and the mass block.

Optionally, the vibrating motor further comprises elastic pieces connected between the housing and the mass block. The elastic pieces are accommodated in the accommodating space.

The present invention further provides the electronic device. The electronic device comprises a shell and the vibrating motor mentioned above. The vibrating motor is mounted in the shell.

Optionally, the electronic device further comprises a display screen fixed to one side of the shell and a connecting piece. The connecting piece is respectively connected to the display screen and the vibrating motor. The display screen vibrates and emits sound along the second direction under driving of the solenoid assembly.

The present invention further provides the control method applied to the vibrating motor in the electronic device mentioned above. The control method comprises:

identifying an application scenario, and determining a vibration type; wherein the vibration type comprises vibration of the vibrator assembly along the first direction, vibration of the vibrator assembly or the solenoid assembly along the second direction;

determining a driving frequency according to the vibration type; wherein the driving frequency is the first vibration frequency, the second vibration frequency, or the third vibration frequency; and generating a vibration signal for driving the vibrating motor to vibrate according to the driving frequency.

In the present invention, since the magnets are obliquely magnetized and the mass block is elastically connected to the housing, the coils apply an oblique driving force to the vibrator assembly. The oblique driving force is decomposed into the first driving force along the first direction and the second driving force along the second direction. The first driving force drives the vibrator assembly to vibrate along the first direction at the first vibration frequency. The second driving force drives the vibrator assembly to vibrate along the second direction at the second vibration frequency or drives the solenoid assembly to vibrate along the second direction at the third vibration frequency. Thus, the vibrating motor provides vibration senses in different directions and the vibrating motor provides large vibration senses for different application scenarios, which is conductive to implementing a plurality of vibration feedback.

DETAILED DESCRIPTION

Figure 1:
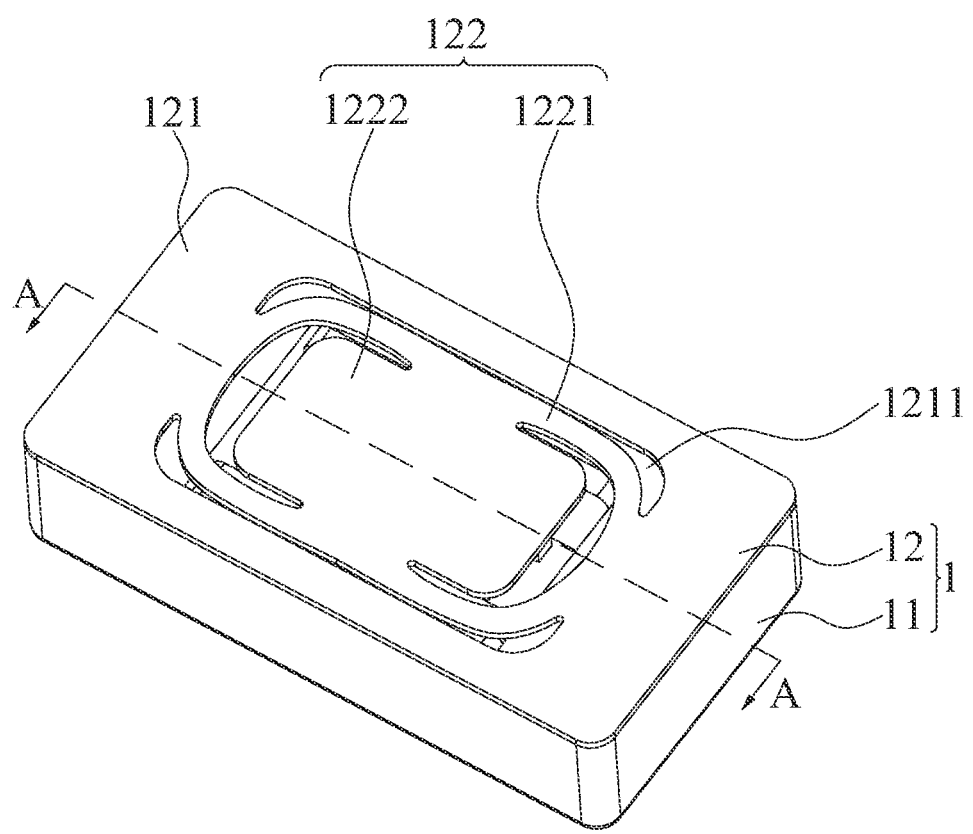
FIG. 1 is a schematic diagram of a vibrating motor according to one embodiment of the present invention where a cover plate comprises a spring structure.

The present invention is further described below in connection with accompanying drawings and embodiments.

As shown in FIGS. 1-10, the present invention provides an electronic device. The electronic device 20 comprises a shell 201 and a vibrating motor 10 mounted in the shell 201. The vibrating motor 10 comprises a housing 1 defining an accommodating space 111, a vibrator assembly 2 accommodated in the accommodating space 111, and a solenoid assembly accommodated in the accommodating space 111. The vibrator assembly 2 comprises a mass block 21 and magnets 22. The mass block 21 defines an accommodating cavity 211. Two ends of the mass block 21 are elastically connected to the housing 1. The magnets 22 are fixed to the mass block 21 and are accommodated in the accommodating cavity 211. The magnets 22 are magnetized obliquely. The magnets 22 are for providing a first driving force in a first direction and a second driving force in a second direction. The first direction is perpendicular to the second direction. The vibrator assembly 2 vibrates along the first direction at a first vibration frequency. The vibrator assembly 2 vibrates along the second direction at a second vibration frequency, or the solenoid assembly vibrates along the second direction at a third vibration frequency. The first vibration frequency, the second vibration frequency, and the third vibration frequency are different.

It should be understood that since the magnets 22 are obliquely magnetized, and the mass block 21 is elastically connected to the housing 1, the coils 3 apply an oblique driving force to the vibrator assembly 2. The oblique driving force is decomposed into a first driving force along the first direction and a second driving force along the second direction. The first driving force drives the vibrator assembly 2 to vibrate along the first direction at the first vibration frequency. The second driving force drives the vibrator assembly 2 to vibrate along the second direction at the second vibration frequency or drives the solenoid assembly to vibrate along the second direction at the third vibration frequency. Thus, the vibrating motor 10 provides vibration senses in different directions and the vibrating motor provides large vibration senses for different application scenarios, which is conductive to implementing a plurality of vibration feedback.

In the embodiment, the vibrating motor is able to vibrate along the first direction (X direction) and the second direction (Z direction). The vibrating motor 10 can be applied in different application scenarios by inputting different vibration frequencies to vibrate in different directions. When the first vibration frequency is input, the vibrating motor 10 vibrates in the first direction, where the vibrator assembly 2 vibrates in the first direction. When the second vibration frequency or the third vibration frequency is input, the vibrating motor 10 vibrates in the second direction at the second vibration frequency. In the second frequency, the vibrator assembly 2 vibrates along the second direction. In the third frequency, the solenoid assembly vibrates along the second direction. The second vibration frequency is greater than the third vibration frequency.

Figure 2:
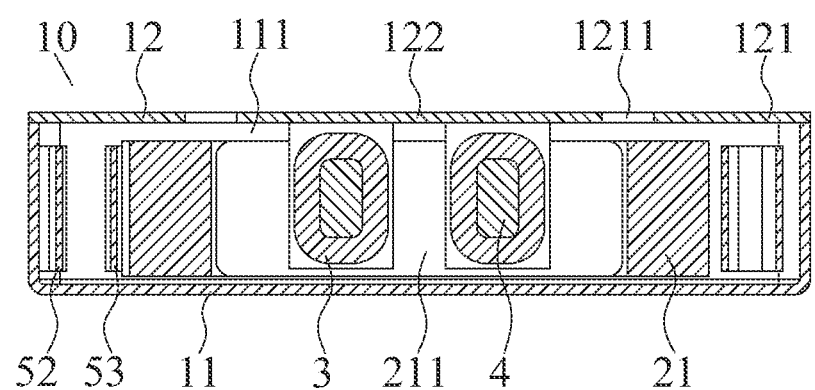
FIG. 2 is a cross-sectional schematic diagram taken along the line A-A shown in FIG. 1.
Figure 4:
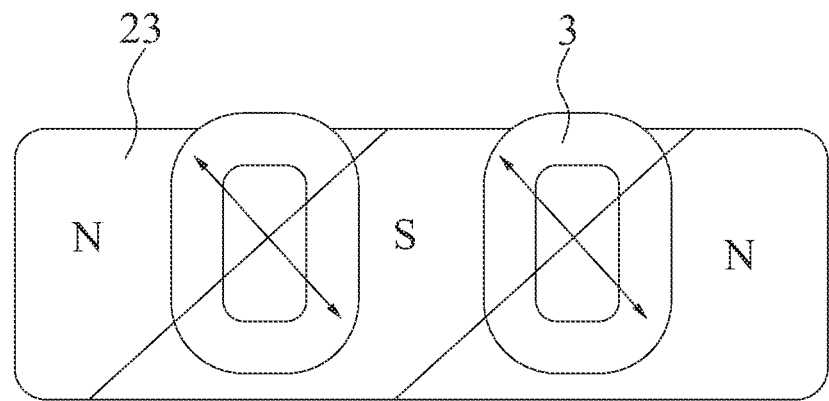
FIG. 4 is a schematic diagram of the vibrating motor according to one embodiment of the present invention showing a magnetization direction of magnets and a direction of a driving force provided by coils.
Figure 6:
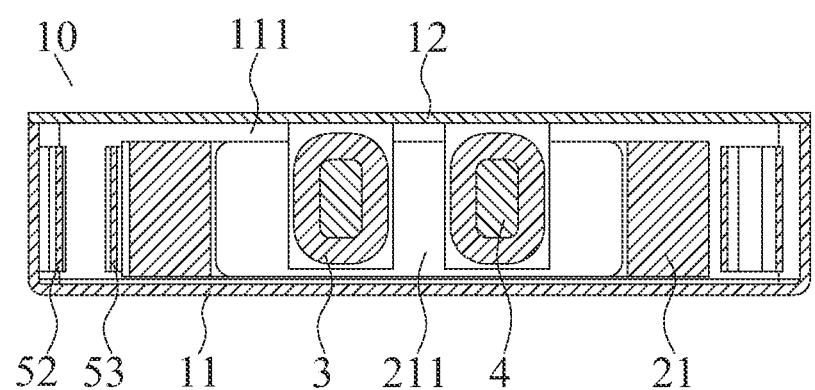
FIG. 6 is a cross-sectional schematic diagram taken along the line B-B shown in FIG. 5.

As shown in FIGS. 2, 4, and 6, lines with arrows represent directions of driving forces provided by the coils, and the lines having no arrow represent a magnetization direction of the magnets. Furthermore, the housing 1 comprises a base 11 defining the accommodating space 111 and a cover plate 12 covered on the base 11. The solenoid assembly comprises iron cores 4 fixedly connected to the cover plate 12 and coils 3 sleeved on an outer side of a respective iron core 4. The iron cores 4 are accommodated in the accommodating cavity 111. Specifically, the magnets 22 are rectangular blocks, and the magnets 22 are obliquely magnetized at 45°. An extending direction of an axis of each of the coils 3 is perpendicular to a plate surface of each of the magnets 22, so that an oblique direction of the oblique driving force provided by the coils 3 is perpendicular to an oblique magnetization direction of the magnets 22, i.e., the oblique driving force is obliquely arranged at 45°, which is conducive to controlling the oblique direction of the oblique driving force by a placement of the coils 3. Optionally, two iron cores 4 spaced apart are arranged in the housing 1, and the iron cores 4 are fixed with the coils 3. The two iron cores 4 are symmetrically arranged with a center line of the cover plate 12 as an axis of symmetry. By combination of the two coils 3, driving force with arbitrary frequency is provided, thereby facilitating precise control of a vibration direction and a vibration frequency of the vibrating motor 10. According to actual needs, the magnets 22 are obliquely magnetized at any oblique angle, such as 15°, 30°, 60°, 75°, etc.

Figure 3:
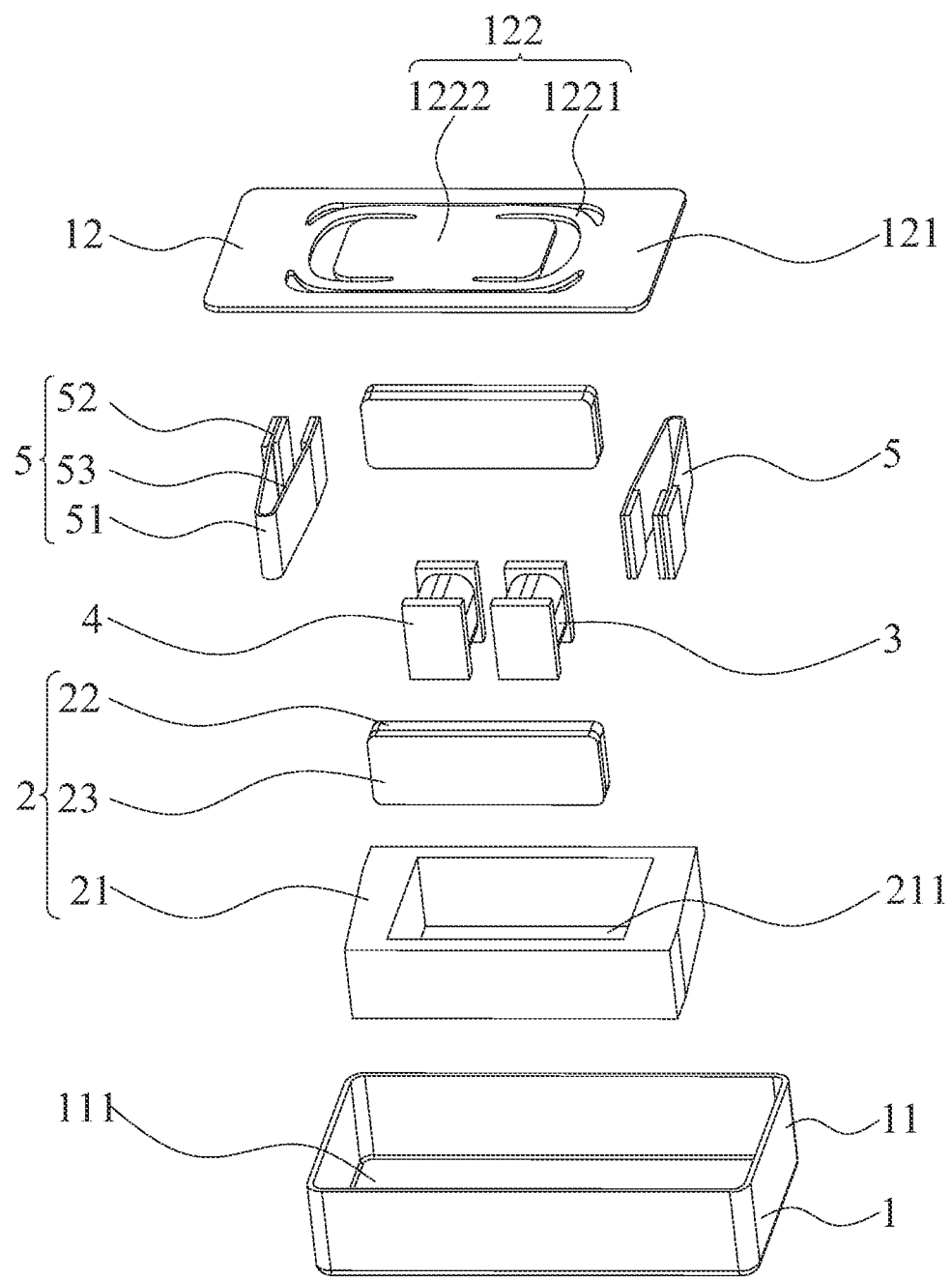
FIG. 3 is an exploded schematic diagram of the vibrating motor according to one embodiment of the present invention where the cover plate comprises the spring structure.

As shown in FIGS. 1-3, the cover plate 12 is a flat spring structure. In the embodiment, the vibrator assembly 2 vibrates along the first direction at the first vibration frequency, and the solenoid assembly vibrates along the second direction at the third vibration frequency.

Furthermore, as shown in FIGS. 1-3, the cover plate 12 comprises a main body portion 121 fixed to the base 11 and a spring structure 122 connected to the main body portion 121. The main body portion 121 defines a mounting through hole 1211. The spring structure 122 is accommodated in the mounting through hole 1211. The iron cores 4 are connected to the spring structure 122. The iron cores 4 vibrate along the second direction at the third vibration frequency. By connecting the iron cores 4 with the spring structure 122 of the cover plate 12, when the iron cores 4 vibrate along the second direction, the third vibration frequency is relatively small. At this time, the second vibration frequency of the vibrator assembly 2 vibrating along the second direction is greater than the third vibration frequency of the iron cores 4 vibrating along the second direction, so as to realize vibration of the vibrator assembly 2 along the first direction and realize vibration of the solenoid assembly along the second direction. According to the actual needs, the cover plate 12 can be made of elastic material, so that the third vibration frequency of the iron cores 4 vibrating along the second direction is relatively small.

As shown in FIGS. 1 and 3, the spring structure 122 comprises an elastic ring 1221 and a connecting portion 1222 arranged in the elastic ring 1221. Two ends of the elastic ring 1221 are respectively connected to a side wall of the main body portion 121. Two ends of the connecting portion 1222 are respectively connected to the elastic ring 1221. A connecting end of the connecting portion 1222 connected to the elastic ring 1221 is adjacent to a connecting end of the elastic ring 1221 connected to the main body portion 121. The iron cores 4 are connected to the connecting portion 1222. Specifically, the connecting end of the elastic ring 1221 connected to the main body portion 121 is an arc structure. Middle portions of two end sides of the connecting portion 1222 are connected to the elastic ring 1221, which enhances a deformation capacity of the spring structure 122. Optionally, the spring structure 122 is symmetrically arranged with the central axis of the cover plate 12 as the axis of symmetry, which is conducive to ensuring a synchronous vibration of the two iron cores 4.

Figure 5:
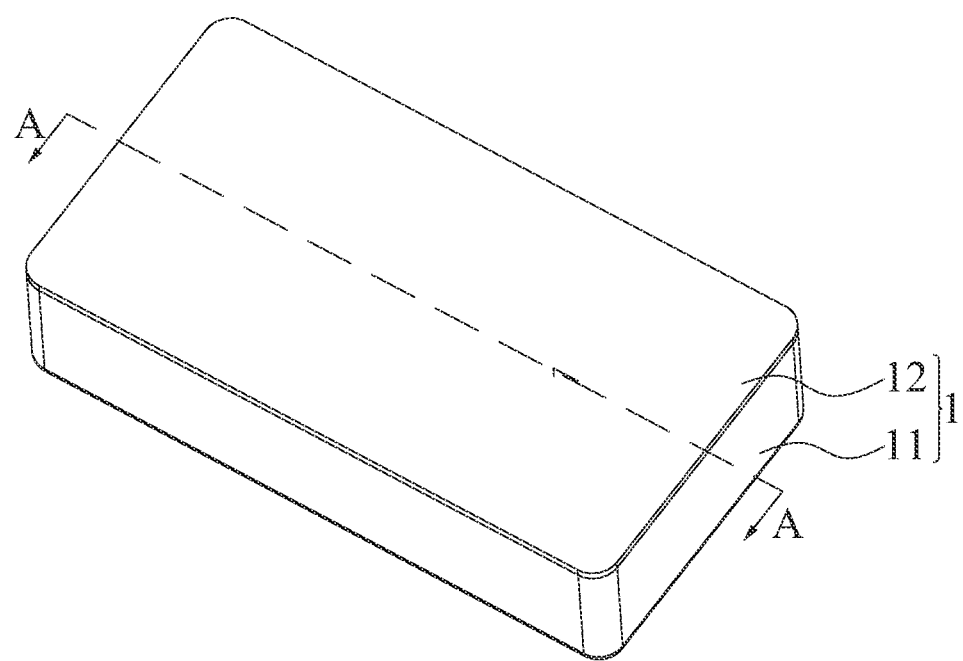
FIG. 5 is a schematic diagram of the vibrating motor according to one embodiment of the present invention where the cover plate is a flat plate.
Figure 7:
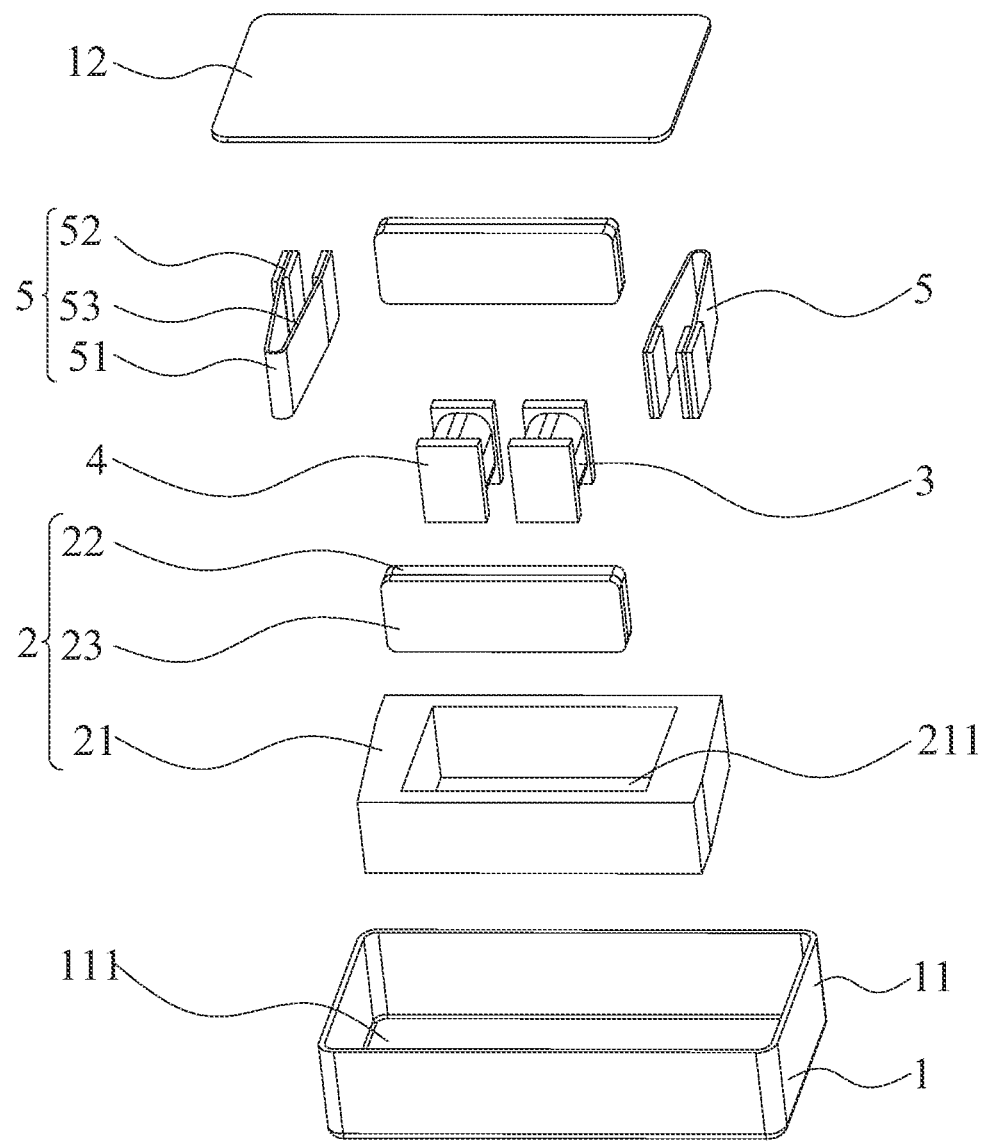
FIG. 7 is an exploded schematic diagram of the vibrating motor according to one embodiment of the present invention where the cover plate is the flat plate.

As shown in FIGS. 5-7, in another embodiment, the cover plate 12 is a flat plate. The vibrator assembly 2 vibrates along the first direction at the first vibration frequency, and the vibrator assembly 2 also vibrates along the second direction at the second vibration frequency. Specifically, the cover plate 12 is a rigid plate. That is, a rigidity of the cover plate 12 is large, so that the third vibration frequency of the iron cores 4 along the second direction is large. At this time, the second vibration frequency of the vibrator assembly 2 vibrating along the second direction is less than the third vibration frequency of the iron cores 4 vibrating along the second direction, so as to realize the vibration of the vibrator assembly 2 along the first direction or the second direction. That is, the solenoid assembly is a stator of the vibrating motor 10.

As shown in FIGS. 3 and 7, in one embodiment, two magnets 22 are provided and are arranged on two opposite sides of the mass block 21. The coils 3 are arranged between the two magnets 22. The coils 3 make full use of a magnetic field created by the magnets 22, which is conductive to increasing the driving force. The vibrating motor 10 further comprises a pole core 23 fixedly connected between the magnets 22 and the mass block 21. The pole core 23 is attached to the magnets 22 and the pole core 23 is configured to collect the magnetic field created by the magnets 22, so as to enhance the magnetic field of the magnets 22 close to one side of the coils 3.

As shown in FIGS. 3 and 7, in one embodiment, the vibrating motor 10 further comprises elastic pieces 5 connected between the housing 1 and the mass block 21. The elastic pieces 5 are accommodated in the accommodating space 111. Specifically, there are two elastic pieces 5 are arranged in the housing 1. The mass block 21 is movably connected to the housing through the elastic pieces 5. Each of the elastic pieces 5 comprises an elastic arm portion 51, a first support portion 52 connected to the base 11, and a second support portion 53 connected to the mass block 21. Each first support portion 52 extends from a first end of a corresponding elastic arm portion 51, and each second support portion 53 extends from a second end of a corresponding elastic arm portion 51. Each second support portion 53 is arranged between a corresponding first support portion 52 and the mass block 21. A gap between each first support portion 52 and a corresponding second support portion 53 is a moving distance of the vibrator assembly 2 along the first direction. Optionally, flexible rubber blocks are arranged on one side of each first support portion 52 opposite to the second support portion and one side of each second support portion 53 opposite to the corresponding first support portion. The flexible rubber blocks reduces collision friction between each first support portion 52 and the corresponding second support portion 53. Thicknesses of side walls of the mass block 21 connected to the elastic pieces 5 gradually decreases along a direction of each second support portion 53 toward the corresponding elastic arm section 51, which prevents the mass block 21 from compressing each elastic arm portion 51. A rectangular plate is arranged on one side of each first support portion 52 close to the base 11. Each first support portion 52 is fixed to the base 11 through a corresponding rectangular plate.

Figure 8:
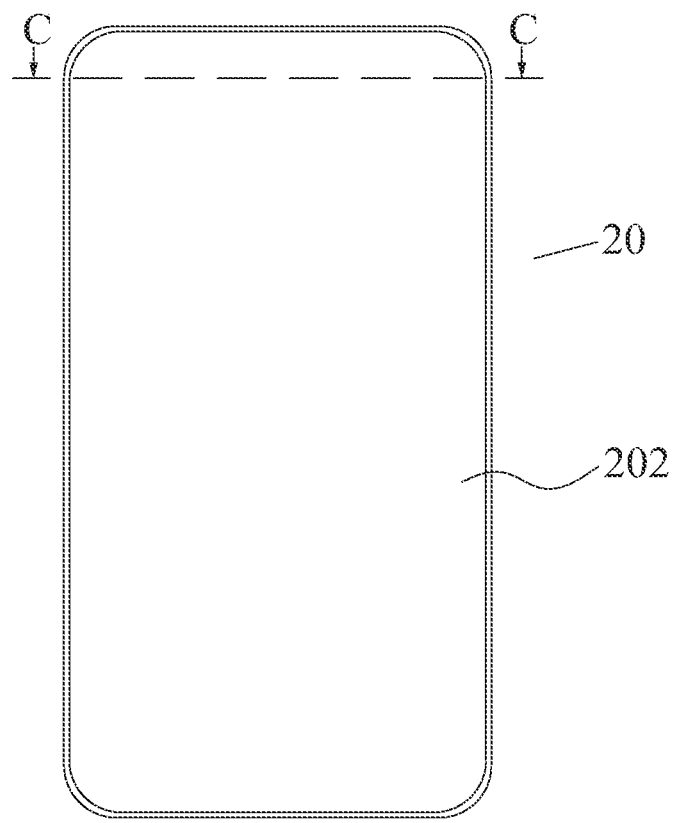
FIG. 8 is a top plan schematic diagram of an electronic device according to one embodiment of the present invention.
Figure 9:
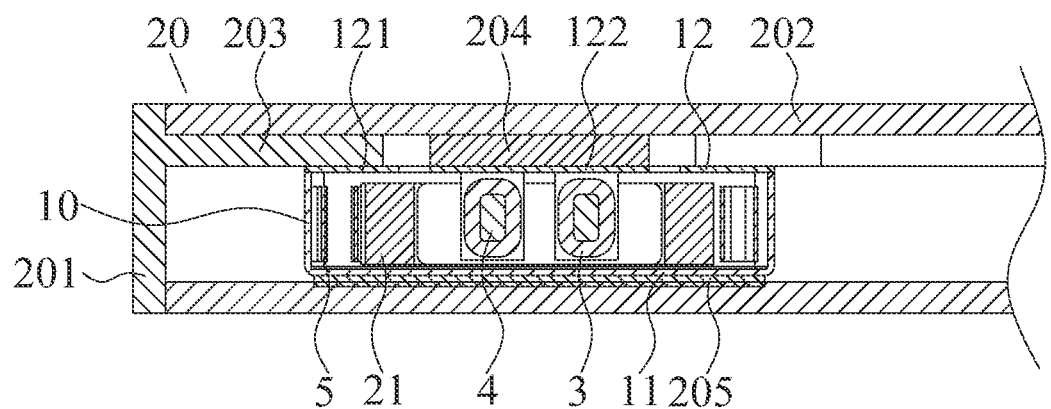
FIG. 9 is a cross-sectional schematic diagram taken along the line C-C shown in FIG. 8 where the cover plate is connected to a display screen.
Figure 10:
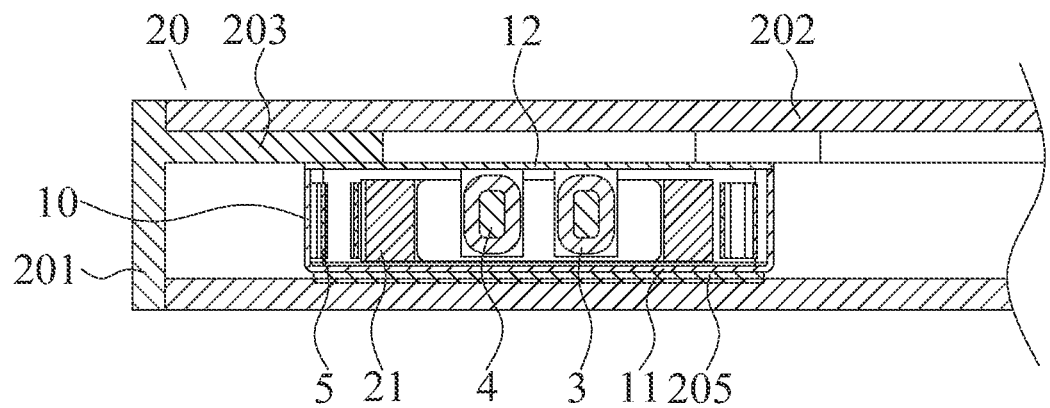
FIG. 10 is a cross-sectional schematic diagram taken along the line C-C shown in FIG. 8 where the cover plate is separated from the display screen.

As shown in FIGS. 8-10, in one embodiment, the electronic device 20 further comprises a display screen 202 fixed to one side of the shell 201 and a connecting piece 204. The connecting piece 204 is respectively connected to the display screen 202 and the vibrating motor 10. The display screen 202 vibrates and emits sound along the second direction under driving of the solenoid assembly.

Specifically, the shell 201 defines an assembly space. The vibrating motor 10 is arranged in the assembly space. Specifically, the spring structure 122 of the cover plate 12 is attached to and connected to the connecting piece 204. The base 11 is connected to an inner wall of the shell 201 through a foam 205. Therefore, the vibrating motor is compressed and fixed in the assembly space. The electronic device 20 further comprises a support plate 203 inwardly extending from an inner wall of the shell 201. The support plate 203 is configured for supporting the display screen 202. One side of the connecting piece 204 away from the cover plate 12 passes through the support plate 203 and is attached to the display screen 202, so that the connecting piece 204 realizes vibration transmission. The connecting piece 204 is a rectangular block. When the iron cores 4 of the vibrating motor 10 vibrate along the second direction, the cover plate 12 deforms to drive the display screen 202 to emit sound. That is, by driving the display screen 202 to vibrate and emit sound along the second direction through the solenoid assembly, a receiver is omitted. The electronic device 20 has functions of the motor and the receiver by arrangement of the motor only, reducing cost of the electronic device 20.

In one embodiment, the cover plate 12 of the vibrating motor 10 is fixedly connected to the support plate 203, i.e., the vibrating motor 10 is spaced apart from the display screen 202. The iron cores 4 of the vibrating motor 10 are fixedly connected to the cover plate 12, and the cover plate 12 is connected to one side of the support plate 203 away from the display screen 202.

Figure 11:
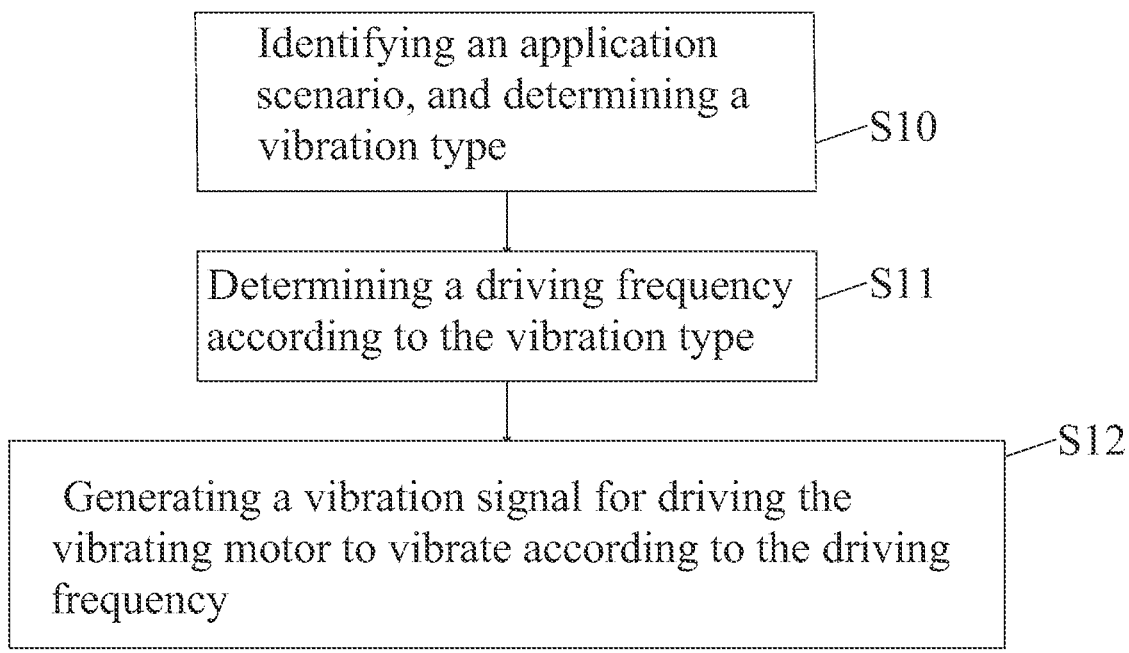
FIG. 11 is a flow chart of a control method according to one embodiment of the present invention.

As shown in FIG. 11, the present invention further provides a control method applied to the vibrating motor in the electronic device mentioned above. The control method comprises:

S10: identifying an application scenario, and determining a vibration type;

Specifically, the application scenario may be typing, playing a game, talking, etc. The vibration type comprises vibration of the vibrator assembly along the first direction, vibration of the vibrator assembly or the solenoid assembly along the second direction; For example, when the application scenario identified is typing, the vibrator assembly is required to vibrate along the second direction to provide a user with a sense of tapping for typing. When the application scenario identified is playing the game, the identified assembly is required to vibrate along the first direction to remind the user of relevant operations. When the application scenario identified is talking, the solenoid assembly is required to vibrate along the second direction to realize sound emitting of the display screen.

S11: determining a driving frequency according to the vibration type; and

Specifically, when the cover plate is the flat spring structure, the vibrator assembly vibrates along the first direction and the solenoid assembly vibrates along the second direction. At this time, the second vibration frequency is greater than the third vibration frequency, and the driving frequency is the first vibration frequency or the third vibration frequency. When the cover plate is the flat plate, the vibrator assembly vibrates along the first direction and the second direction. At this time, the second vibration frequency is less than the third vibration frequency, and the driving frequency is the first vibration frequency or the second vibration frequency.

S12: generating a vibration signal for driving the vibrating motor to vibrate according to the driving frequency.

Specifically, when the driving frequency is the first vibration frequency, the vibration signal for driving the vibrator assembly to vibrate along the first direction is generated. When the driving frequency is the second vibration frequency, the vibration signal for driving the vibrator assembly to vibrate along the second direction is generated. When the driving frequency is the third vibration frequency, the vibration signal for driving the solenoid assembly to vibrate along the second direction is generated.

The above described is only implementations of the present invention, and it should be noted herein that for a person of ordinary skill in the art, improvements can be made without departing from the creative idea of the present invention, and these improvements are within the protection scope of the present invention.

What is claimed is:

1. A vibrating motor, comprising:
a housing defining an accommodating space,
a vibrator assembly accommodated in the accommodating space, and
a solenoid assembly accommodated in the accommodating space;
wherein the vibrator assembly comprises a mass block and magnets; the mass block defines an accommodating cavity; two ends of the mass block are elastically connected to the housing; the magnets are fixed to the mass block and are accommodated in the accommodating cavity;
wherein the magnets are obliquely magnetized, the magnets are for providing a first driving force in a first direction and a second driving force in a second direction; the first direction is perpendicular to the second direction; the vibrator assembly vibrates along the first direction at a first vibration frequency; the vibrator assembly vibrates along the second direction at a second vibration frequency; or the solenoid assembly vibrates along the second direction at a third vibration frequency; the first vibration frequency, the second vibration frequency, and the third vibration frequency are different; the housing comprises a base defining the accommodating space and a cover plate covered on the base; the solenoid assembly comprises iron cores fixedly connected to the cover plate and coils sleeved on an outer side of a respective iron core; the iron cores are accommodated in the accommodating cavity; the cover plate comprises a main body portion fixed to the base and a spring structure connected to the main body portion; the main body portion defines a mounting through hole; the spring structure is accommodated in the mounting through hole; the iron cores are connected to the spring structure; the iron cores vibrate along the second direction at the third vibration frequency; the spring structure comprises an elastic ring and a connecting portion arranged in the elastic ring; two ends of the elastic ring are respectively connected to a side wall of the main body portion; two ends of the connecting portion are respectively connected to the elastic ring; a connecting end of the connecting portion is adjacent to a connecting end of the elastic ring; the iron cores are connected to the connecting portion.

2. The vibrating motor according to claim 1, wherein two magnets are provided and are arranged on two opposite sides of the mass block; the coils are arranged between the two magnets, and the vibrating motor further includes a pole core fixedly connected between the magnets and the mass block.

3. The vibrating motor according to claim 1, wherein the vibrating motor further comprises elastic pieces connected between the housing and the mass block; the elastic pieces are accommodated in the accommodating space.

4. An electronic device, comprising a shell and the vibrating motor according to claim 1, wherein the vibrating motor is mounted in the shell.

5. The electronic device according to claim 4, wherein the electronic device further comprises a display screen fixed to one side of the shell and a connecting piece; the connecting piece is connected to the display screen and the vibrating motor, the display screen vibrates and emits sound along the second direction under driving of the solenoid assembly.

6. A control method applied to the vibrating motor in the electronic device according to claim 4, comprising:
identifying an application scenario, and determining a vibration type; wherein the vibration type comprises vibration of the vibrator assembly along the first direction, vibration of the vibrator assembly or the solenoid assembly along the second direction;
determining a driving frequency according to the vibration type; wherein the driving frequency is the first vibration frequency, the second vibration frequency, or the third vibration frequency; and
generating a vibration signal for driving the vibrating motor to vibrate according to the driving frequency.

* * * * *